United States Patent
Maltsev et al.

(10) Patent No.: US 9,231,681 B2
(45) Date of Patent: Jan. 5, 2016

(54) APPARATUS, SYSTEM AND METHOD OF WIRELESS BACKHAUL AND ACCESS COMMUNICATION VIA A COMMON ANTENNA ARRAY

(71) Applicant: Intel Corporation, Santa Clara, CA (US)

(72) Inventors: Alexander Maltsev, Nizhny Novgorod (RU); Ali S. Sadri, San Diego, CA (US); Reza Arefi, Great Falls, VA (US); Vadim Sergeyev, Nizhny Novgorod (RU); Alexei Davydov, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 15 days.

(21) Appl. No.: 13/869,541

(22) Filed: Apr. 24, 2013

(65) Prior Publication Data

US 2014/0204846 A1    Jul. 24, 2014

Related U.S. Application Data

(60) Provisional application No. 61/754,708, filed on Jan. 21, 2013.

(51) Int. Cl.
    *H04B 7/06*    (2006.01)
(52) U.S. Cl.
    CPC ................... *H04B 7/0617* (2013.01)
(58) Field of Classification Search
    None
    See application file for complete search history.

(56) References Cited

U.S. PATENT DOCUMENTS

| | | | |
|---|---|---|---|
| 8,300,590 B1 | 10/2012 | Negus et al. | |
| 8,599,955 B1* | 12/2013 | Kludt et al. | 375/267 |
| 8,797,969 B1* | 8/2014 | Harel et al. | 370/328 |
| 2001/0036810 A1 | 11/2001 | Larsen | |
| 2004/0008663 A1 | 1/2004 | Srikrishna et al. | |
| 2005/0094585 A1 | 5/2005 | Golden et al. | |
| 2008/0080414 A1* | 4/2008 | Thubert et al. | 370/328 |
| 2008/0090575 A1 | 4/2008 | Barak et al. | |

(Continued)

FOREIGN PATENT DOCUMENTS

| | | |
|---|---|---|
| JP | 2012175675 | 9/2012 |
| KR | 20110092478 | 8/2011 |

(Continued)

OTHER PUBLICATIONS

International Search Report and Written Opinion for PCT Patent Application No. PCT/US2014/012169, mailed on Apr. 24, 2014, 15 pages.

(Continued)

*Primary Examiner* — Donald Mills
(74) *Attorney, Agent, or Firm* — Shichrur & Co.

(57) ABSTRACT

Some demonstrative embodiments include apparatuses, systems and/or methods of wireless backhaul and access communication via a common antenna array. For example, an apparatus may include a wireless communication unit to control an antenna array to form one or more first beams for communicating over one or more access links and to form one or more second beams for communicating over one or more backhaul links, the access links including wireless communication links between a wireless communication node and one or more mobile devices, and the backhaul links including wireless communication links between the wireless node and one or more other wireless communication nodes.

24 Claims, 6 Drawing Sheets

(56) References Cited

U.S. PATENT DOCUMENTS

| | | | |
|---|---|---|---|
| 2008/0181183 A1 | 7/2008 | Gale et al. | |
| 2009/0303935 A1 | 12/2009 | Ozluturk | |
| 2010/0234071 A1* | 9/2010 | Shabtay et al. | 455/562.1 |
| 2011/0038308 A1 | 2/2011 | Song et al. | |
| 2011/0069687 A1* | 3/2011 | Rezvani et al. | 370/338 |
| 2011/0182174 A1 | 7/2011 | Pi et al. | |
| 2012/0113884 A1 | 5/2012 | Park et al. | |
| 2012/0250603 A1 | 10/2012 | Huang et al. | |
| 2013/0070743 A1* | 3/2013 | Picker | 370/338 |
| 2013/0084868 A1 | 4/2013 | Song et al. | |
| 2013/0095747 A1 | 4/2013 | Moshfeghi | |
| 2013/0121185 A1* | 5/2013 | Li et al. | 370/252 |
| 2013/0142136 A1* | 6/2013 | Pi et al. | 370/329 |
| 2014/0185497 A1 | 7/2014 | Wolf et al. | |
| 2014/0247752 A1 | 9/2014 | Patil et al. | |

FOREIGN PATENT DOCUMENTS

| | | |
|---|---|---|
| KR | 20130007494 | 1/2013 |
| WO | 2009041754 | 4/2009 |

OTHER PUBLICATIONS

International Search Report and Written Opinion for PCT Patent Application No. PCT/US2014/012477, mailed on Apr. 24, 2014, 12 pages.

Uday Mudoi, "Understanding Small-Cell Unification's Vital Role in LTE and 4G", Electronic Design, Aug. 2, 2012, 6 pages.

Office Action for U.S. Appl. No. 13/865,625, mailed on Apr. 21, 2015, 25 pages.

WiGig MAC and PHY Specification; Version 1.1; Apr. 2011—Final Specification. pp. 1-442.

IEEE Std 802.11™-2012 (Revision of IEEE Std 802.11-2007) IEEE Standard for Information technology—Telecommunications and information exchange between systems Local and metropolitan area networks—Specific requirements Part 11: Wireless LAN Medium Access Control (MAC) and Physical Layer (PHY) Specifications Mar. 29, 2012, pp. 1-2793.

IEEE Std 802.11ad™-2012 (Amendment to IEEE Std 802.11™-2012, as amended by IEEE Std 802.11ae™-2012 and IEEE Std 802.11aa™-2012) IEEE Standard for Information technology—Telecommunications and information exchange between systems Local and metropolitan area networks—Specific requirements Part 11: Wireless LAN Medium Access Control (MAC) and Physical Layer (PHY) Specifications, 1-628.

ETSI TS 136 300 V11.3.0 (Nov. 2012): LTE; Evolved Universal Terrestrial Radio Access (EUTRA) and Evolved Universal Terrestrial Radio Access Network (E-UTRAN); Overall description; Stage 2 (3GPP TS 36.300 version 11.3.0 Release 11), Nov. 2012, pp. 1-217.

U.S. Appl. No. 13/865,625, filed Apr. 18, 2013, pp. 1-68.

International Preliminary Report on Patentability and Written Opinion for International Patent Application No. PCT/US2014/012169, mailed on Jul. 30, 2015, 11 pages.

International Preliminary Report on Patentability and Written Opinion for International Patent Application No. PCT/US2014/012477, mailed on Aug. 6, 2015, 9 pages.

* cited by examiner

APPARATUS, SYSTEM AND METHOD OF WIRELESS BACKHAUL AND ACCESS COMMUNICATION VIA A COMMON ANTENNA ARRAY

CROSS REFERENCE

This Application claims the benefit of and priority from U.S. Provisional Patent Application No. 61/754,708 entitled "Apparatus, System and Method of Wireless Backhaul and Access Communication via a Common Antenna Array", filed Jan. 21, 2013, the entire disclosure of which is incorporated herein by reference.

TECHNICAL FIELD

Embodiments described herein generally relate to wireless communication via an antenna array.

BACKGROUND

Some wireless communication systems may communicate over the Millimeter wave (mmWave) frequency band, e.g., the 60 GHz Frequency band. A mmWave propagation has a few major distinctive features in comparison with lower frequency bands, e.g., the frequency bands of 2.4-5 GHz. For example, the mmWave propagation may have a propagation loss greater than the propagation loss in the lower frequency bands, and may have Quasi-optical propagation properties.

A mmWave communication system may use high-gain directional antennas to compensate for large path loss and/or employ beam-steering techniques. Design of appropriate antenna system and/or further signal processing may be an important aspect of mmWave communication system development.

Multi-element phased antenna arrays may be used, for example, for creation of a directional antenna pattern. A phased antenna array may form a directive antenna pattern or a beam, which may be steered by setting appropriate signal phases at the antenna elements.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
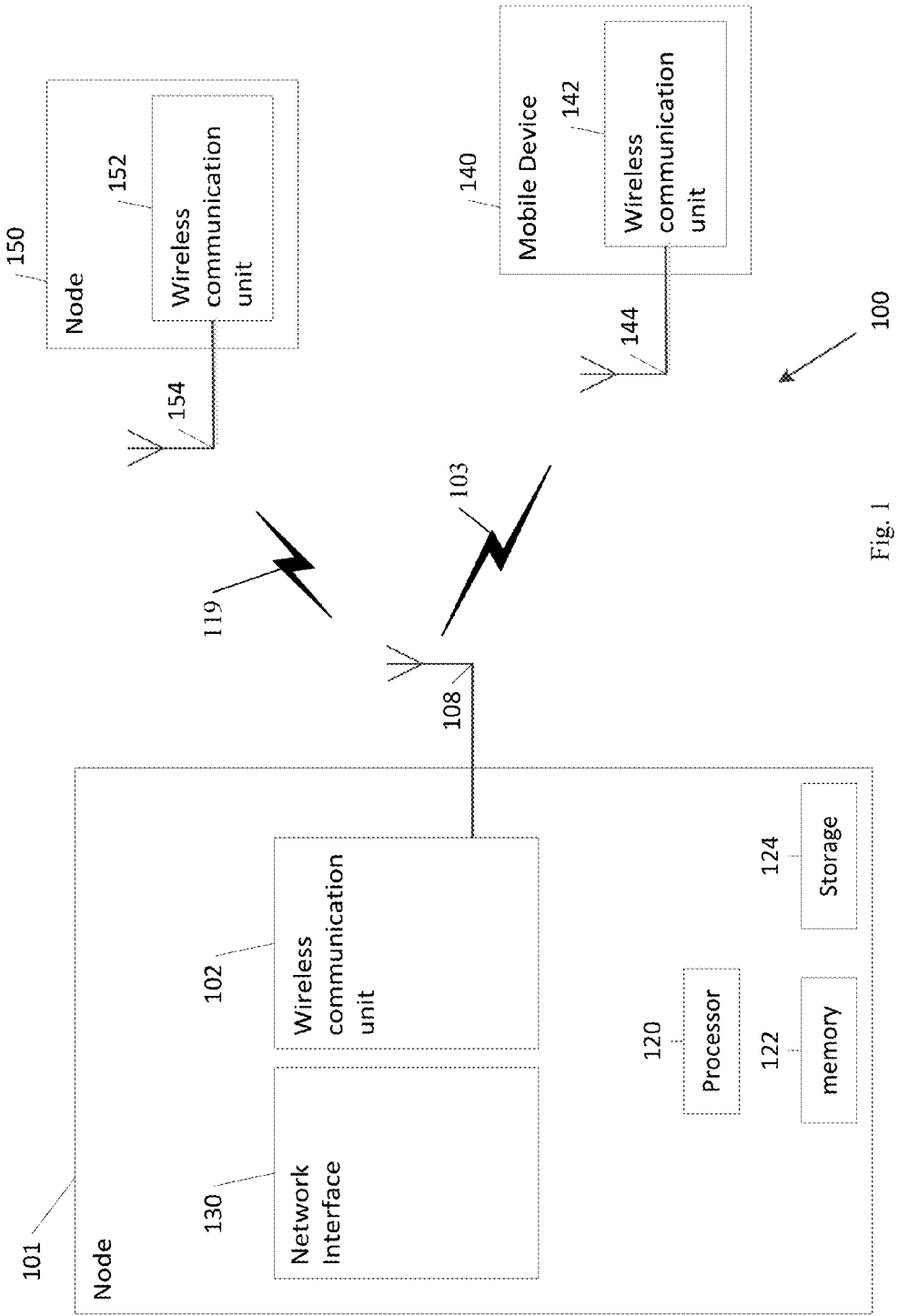
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, an Ultrabook™ computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11 task group ac (TGac) ("IEEE802.11-09/0308r12—TGac Channel Model Addendum Document"); IEEE 802.11 task group ad (TGad) (IEEE P802.11ad Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band)) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with a WLAN. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 20 Ghz and 300 GHZ, a WLAN frequency band, a WPAN frequency band, a frequency band according to the WGA specification, and the like.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a station-to-station (STA-to-STA) communication in an independent basic service set (IBSS), or the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "mmWave frequency band" as used herein may relate to a frequency band above 20 GHz, e.g., a frequency band between 20 GHz and 300 GHz.

The phrases "directional multi-gigabit (DMG)" and "directional band" (DBand), as used herein, may relate to a frequency band wherein the Channel starting frequency is above 40 GHz.

The phrases "DMG STA" and "mmWave STA (mSTA)" may relate to a STA having a radio transmitter, which is operating on a channel that is within the mmWave or DMG band.

The term "beamforming", as used herein, may relate to a spatial filtering mechanism, which may be used at a transmitter and/or a receiver to improve one or more attributes, e.g., the received signal power or signal-to-noise ratio (SNR) at an intended receiver.

The term "cell", as used herein, may include a combination of network resources, for example, downlink and optionally uplink resources. The resources may be controlled and/or allocated, for example, by a wireless communication node (also referred to as a "node" or a "base station"), or the like. The linking between a carrier frequency of the downlink resources and a carrier frequency of the uplink resources may be indicated in system information transmitted on the downlink resources.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via a wireless medium (WM). For example, system 100 may include one or more wireless communication nodes, e.g., including nodes 101 and 150, and one or more mobile devices, e.g., including mobile device 140. The wireless medium may include, for example, a radio channel, a cellular channel, an RF channel, a Wireless Fidelity (WiFi) channel, an IR channel, and the like. One or more elements of system 100 may optionally be capable of communicating over any suitable wired communication links.

In some demonstrative embodiments, node 101, node 150 and mobile device 140 may form and/or communicate as part of one or more wireless communication networks. For example, node 101 and mobile device 140 may form and/or may communicate as part of a wireless communication cell, e.g., as described below.

In some demonstrative embodiments, nodes 101 and/or 150 may include or may perform the functionality of a Base Station (BS), a macro BS, a micro BS, an Access Point (AP), a WiFi node, a Wimax node, a cellular node, e.g., an Evolved Node B (eNB), an LTE node, a station, a hot spot, a network controller, and the like.

In some demonstrative embodiments, mobile device 140 may include, for example, a User Equipment (UE), a mobile computer, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, or the like.

In some demonstrative embodiments, node 101, node 150 and/or mobile device 140 may include one or more wireless communication units to perform wireless communication between node 101, node 150 and/or mobile device 140 and/or with one or more other wireless communication devices, e.g., as described below. For example, node 101 may include a wireless communication unit 102, node 150 may include a wireless communication unit 152 and/or mobile device 140 may include a wireless communication unit 142.

In some demonstrative embodiments, wireless communication units 102, 152 and 142 may include, or may be associated with, one or more antennas. In one example, wireless communication unit 102 may be associated with one or more antennas 108; wireless communication unit 152 may be associated with one or more antennas 154; and/or wireless communication unit 142 may be associated with one or more antennas 144.

Antennas 108, 154 and/or 144 may include any type of antennas suitable for transmitting and/or receiving wireless communication signals, blocks, frames, transmission streams, packets, messages and/or data. For example, antennas 108, 154 and/or 144 may include any suitable configuration, structure and/or arrangement of one or more antenna elements, components, units, assemblies and/or arrays. Antennas 108, 154 and/or 144 may include, for example, antennas suitable for directional communication, e.g., using beamforming techniques. For example, antennas 108, 154 and/or 144 may include a phased array antenna, a multiple element antenna, a set of switched beam antennas, and/or the like. In some embodiments, antennas 108, 154 and/or 144 may implement transmit and receive functionalities using separate transmit and receive antenna elements. In some embodiments, antennas 108, 154 and/or 144 may implement transmit and receive functionalities using common and/or integrated transmit/receive elements.

In some demonstrative embodiments, nodes 101 and/or 150 may also include, for example, one or more of a processor 120, a memory unit 122, and a storage unit 124. Node 101 may optionally include other suitable hardware components and/or software components. In some demonstrative embodiments, some or all of the components of node 101 may be enclosed in a common housing or packaging, and may be interconnected or operably associated using one or more wired or wireless links. In other embodiments, components of node 101 may be distributed among multiple or separate devices.

Processor 120 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 120 executes instructions, for example, of an Operating System (OS) of node 101 and/or of one or more suitable applications.

Memory unit 122 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 124 includes, for example, a hard disk drive, a floppy disk drive, a Compact Disk (CD) drive, a CD-ROM drive, a DVD drive, or other suitable removable or non-removable storage units. Memory unit 122 and/or storage unit 124, for example, may store data processed by node 101.

In some demonstrative embodiments, antennas 108 may include an antenna array, which may include a plurality of antenna elements, e.g., as described below. The plurality of antenna elements of the antenna array may be configured, for example, for creation of a plurality of highly-directional antenna patterns. The plurality of antenna elements may include, for example, about 16-36 antenna elements, or any other number of antenna elements, which may be placed in a predefined geometry. The plurality of antenna elements may be configured to form a plurality of highly directive antenna patterns or beams, which may be steered by setting appropriate signal phases at the antenna elements, e.g., as described below.

In some demonstrative embodiments, wireless communication unit 102 may be configured to control antenna array 108 to generate and steer the plurality of beams to be directed to a plurality of other devices, e.g., including node 150 and mobile device 140. Wireless communication unit 102 may communicate with the plurality of other devices via a plurality of wireless communication links over the plurality of beams formed by antenna array 108, as described in detail below.

In some demonstrative embodiments, one or more elements of system 100 may utilize the mmWave communication band to provide wireless connectivity for a relatively large coverage area. In one example, elements of system 100 may be deployed, for example, in outdoor spaces, e.g., a street, a stadium, and the like, and/or large indoor areas, e.g., conference halls, and the like.

For example, system 100 may include a plurality of small cells, e.g., a large number of small cells, which may be deployed to cover the large coverage area, e.g., as described below with reference to FIG. 2. A cell may include a wireless communication node, e.g., a BS, which may be configured to cover and/or serve a relatively small number of users, for example, mobile devices, e.g., User Equipment (UE), and the like. The deployment of the small cells may provide, for example, high-speed wireless access for communication by many users, e.g., simultaneously.

In one example, a first cell may include node 101, which may serve one or more users, e.g., including mobile device 140; and a second cell may include node 150, which may serve one or more users (not shown in FIG. 1).

In some demonstrative embodiments, wireless communication node 101 may communicate with the mobile devices of the first cell via a plurality of wireless communication links ("access links"). For example, wireless communication node 101 may communicate with mobile device 140 via a wireless access link 103. Wireless access link 103 may include a downlink for communicating downlink data from wireless communication node 101 to mobile device 140 and/or an uplink for communicating uplink data from mobile device 140 to wireless communication node 101.

In some demonstrative embodiments, backhaul links may be utilized for communication between the wireless communication nodes. For example, wireless communication node 101 may communicate with wireless communication node 150 via a wireless backhaul link 119.

In some demonstrative embodiments, the backhaul links may be utilized for direct or indirect communication between the wireless communication nodes.

In some demonstrative embodiments, the backhaul links may be utilized for communicating between the wireless communication nodes and a core network.

In some demonstrative embodiments, at least one wireless communication node of system 100 may be connected to a core network, and one or more other wireless communication nodes may communicate with the core network via the backhaul links.

In some demonstrative embodiments, wireless communication node 101 may include at least one network interface 130 configured to communicate with at least one core network, e.g., a telephone network, the Internet, a Local Area Network (LAN), and the like, via one or more wired and/or wireless connections. For example, network interface 130 may include a modulator-demodulator (Modem), a Cable Modem, a router, and the like.

In some demonstrative embodiments, the core network may optionally be configured to enable communication between one or more elements of the wireless communication network, e.g., over a wired connection.

In some demonstrative embodiments, the backhaul links, e.g., backhaul link 119, may include high-throughput links, which may be required to communicate high throughput data between the wireless communication nodes and the core network.

In some demonstrative embodiments, the wireless backhaul links, e.g., wireless backhaul link 119, may be utilized, for example, for systems including a relatively high density of nodes per area unit.

In some demonstrative embodiments, utilizing separate antenna systems at a node of system 100 for access and backhaul, e.g., one or more antenna arrays dedicated for communication over backhaul links and one or more other antenna arrays dedicated for communication over access links, may be beneficial in some aspects. For example, utilizing separate antenna systems at a node for access and backhaul may limit interference in an environment, e.g., since directional antenna arrays may be utilized for directional backhaul links; and/or may enable using different types of antennas, for example, for forming the access and backhaul links in different frequency bands.

However, in some demonstrative embodiments, a node, e.g., a mmWave node, implementing separate antennas for access and backhaul, e.g., over the mmWave band, may be bulky, expensive, complex and/or inefficient.

In some demonstrative embodiments, one or more wireless communication nodes of system 100, e.g., wireless communication node 101, may utilize a common antenna array for communicating over both one or more backhaul links, e.g., backhaul link 119, and for communicating over one or more access links, e.g., access link 103, as described below.

In some demonstrative embodiments, high throughputs of the access links may require comparable high throughput backhaul links. Accordingly, it may be beneficial to implement the backhaul links, e.g., backhaul link 119, in the mmWave band as well.

Some demonstrative embodiments are described herein with reference to a device, e.g., node 101, utilizing one common antenna array, for example, antenna array 108, e.g., a single common antenna array, for communicating over both access and backhaul links, e.g., backhaul link 119 and access link 103. However, in other embodiments a device, e.g., a node or any other suitable device, may include a plurality of common antenna arrays, e.g., each configured to communicate over both the access and backhaul links.

In some demonstrative embodiments, wireless backhaul link 119 may include a direct link, e.g., a P2P link, for example, to enable direct communication between nodes 101 and 150; and/or wireless access link 103 may include a direct link, e.g., a P2P link, for example, to enable direct communication between node 101 and mobile device 140. In other embodiments, wireless access link 103 may include a point-to-multipoint, multicast, broadcast and/or any other suitable type of link to allow communication between node 101 and two or more mobile devices, e.g. simultaneously.

In some demonstrative embodiments, wireless access link 103 and/or wireless backhaul link 119 may include a wireless communication link over the mmWave band, e.g., the DMG band.

In some demonstrative embodiments, nodes 101 and/or 150, and/or mobile device 140 may perform the functionality of mmWave STAs, e.g., DMG stations ("DMG STA"). For example, nodes 101 and/or 150, and/or mobile device 150 may be configured to communicate over the DMG band.

In some demonstrative embodiments, wireless access link 103 and/or wireless backhaul link 119 may include a wireless beamformed link.

In some demonstrative embodiments, wireless access link 103 and/or wireless backhaul link 119 may include a wireless gigabit (WiGig) link. For example, wireless access link 103 and/or wireless backhaul link 119 may include a wireless beamformed link over the 60 GHZ frequency band.

In other embodiments, wireless access link 103 and/or wireless backhaul link 119 may include any other suitable link and/or may utilize any other suitable wireless communication technology.

In some demonstrative embodiments, wireless communication unit 102 may control antenna array 108 to form one or more first beams for communicating over one or more access links, e.g., including access link 103, with one or more mobile devices, e.g., mobile device 140; and to form one or more second beams for communicating over one or more backhaul links, e.g., including backhaul link 119, with one or more wireless communication nodes, e.g., node 150, e.g., as described below.

In some demonstrative embodiments, wireless communication unit 102 may control antenna array 108 to communicate over backhaul link 119 and access link 103 during separate time periods, e.g., as described below.

In some demonstrative embodiments, wireless communication unit 102 may control antenna array 108 to communicate over backhaul link 119 and access link 103 during a common time period, e.g., as described below.

In some demonstrative embodiments, wireless communication unit 102 may control antenna array 108 to communicate over backhaul link 119 and access link 103 according to a Multi-User (MU) Multi-Input-Multi-Output (MIMO) scheme. For example, wireless communication unit may control antenna array 108 to communicate a MIMO communication over a plurality of beams including one or more first beams directed to one or more wireless communication nodes, and one or more second beams directed to one or more mobile devices, e.g., as described below.

In some demonstrative embodiments, wireless communication unit 102 may control antenna array 108 to transmit communications over backhaul link 119 and access link 103 during a first common time period, and to receive communications over backhaul link 119 and access link 103 during a second common time period, e.g., as described below.

In some demonstrative embodiments, wireless communication unit 102 may control one or more first sub-arrays of antenna array 108 to form the one or more first beams, and to control one or more second sub-arrays of antenna array 108 to form the one or more second beams, e.g., as described below.

In some demonstrative embodiments, the access and backhaul links may not be required to operate synchronously, although they could.

In some demonstrative embodiments, the access and backhaul links may use different physical (PHY) layer designs, e.g. different signal waveforms, for access and for backhaul. However, in other embodiments the same PHYs may also be used.

Figure 2:
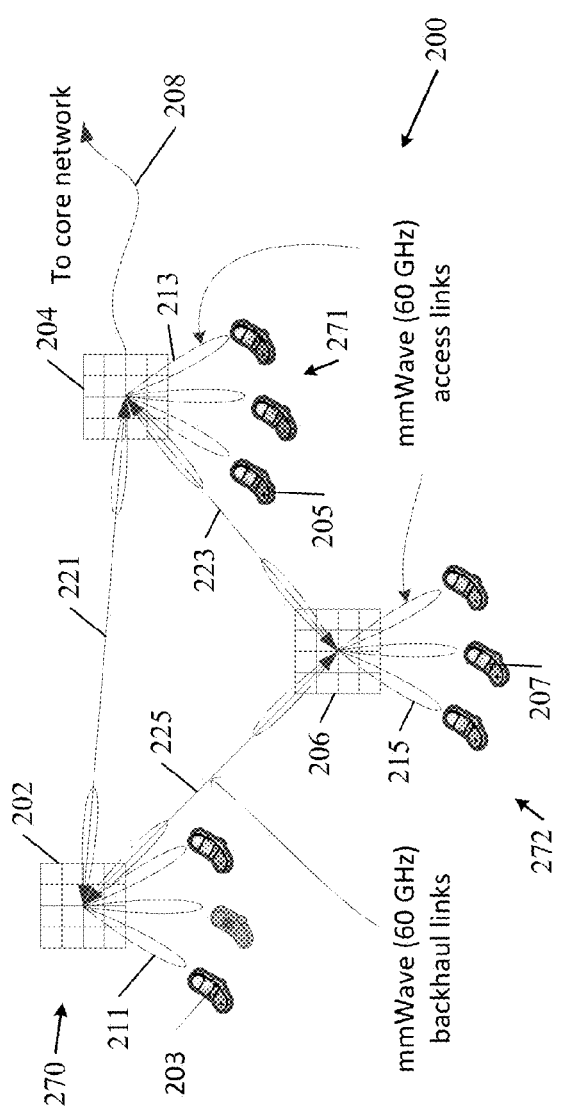
FIG. 2 is a schematic illustration of a multi-cell wireless communication system, in accordance with some demonstrative embodiments.

Reference is made to FIG. 2, which schematically illustrates a multi-cell wireless communication system 200, in accordance with some demonstrative embodiments.

In some demonstrative embodiments, system 200 may include a plurality of wireless communication devices configured to form a plurality of cells, e.g., small cells, for communicating with one or more mobile devices.

In some demonstrative embodiments, one or more elements of system 100 may utilize the mmWave communication band to provide wireless connectivity for a relatively large coverage area. In one example, elements of system 200 may be deployed, for example, in outdoor spaces, e.g., a street, a stadium, and the like, and/or large indoor areas, e.g., conference halls, and the like. For example, system 200 may include a large number of small cells, which may be deployed to cover the large coverage area.

In some demonstrative embodiments, system 200 may include a wireless communication node 202 to communicate with one or more mobile devices 203 of a first cell 270, a wireless communication node 204 to communicate with one or more mobile devices 205 of a second cell 271, and a wireless communication nodes 206 to communicate with one or more mobile devices 207 of a third cell 272.

In one example, node 101 (FIG. 1) may perform the functionality of one node of nodes 202, 204 and 206; node 150 (FIG. 1) may perform the functionality of another node of nodes 202, 204 and 206; and/or mobile device 140 (FIG. 1) may perform the functionality of a mobile device of mobile devices 203, 205 and 207.

In some demonstrative embodiments, node 202 may be configured to communicate with mobile devices 203 within cell 270 via one or more first wireless communication access links 211; node 204 may be configured to communicate with mobile devices 205 within cell 271 via one or more second wireless communication access links 213; and/or node 206 may be configured to communicate with mobile devices 207 within cell 272 via one or more third wireless communication access links 215.

In some demonstrative embodiments, nodes 202, 204 and/or 206 may be configured to form one or more wireless communication backhaul links for wirelessly communicating information, e.g., backhaul information, between nodes 202, 204 and/or 206.

In one example, node 202 may communicate with node 204 over a wireless backhaul link 221 formed between node 202 and node 204; node 202 may communicate with node 206 over a wireless backhaul link 225 formed between node 202 and node 206; and/or node 204 may communicate with node 206 over a wireless backhaul link 223 formed between node 204 and node 206.

In some demonstrative embodiments, at least one node of system 200 may be connected, e.g., via a wired or wireless link 208, to a core network.

In one example, as shown in FIG. 2, node 204 may be connected to the code network. According to this example, node 202 may communicate with the core network via the backhaul link 221 between node 202 and node 204 and/or node 206 may communicate with the core network via the backhaul link 223 between node 206 and node 204.

In some demonstrative embodiments, nodes 202, 204 and/or 206 may be configured to form one or more of access links 211, 213 and 215 over the mmWave band, e.g., over the 60 GHz frequency band.

In some demonstrative embodiments, nodes 202, 204 and/or 206 may be configured to form one or more of backhaul links 221, 223 and 225 over the mmWave band, e.g., over the 60 GHz frequency band.

In some demonstrative embodiments, at least one of nodes 202, 204 and 206 may be configured to utilize a common antenna array for commonly communicating over the access and backhaul links.

In one example, node 202 may utilize a common antenna array for communicating over access links 211 with mobile devices 203 of cell 270, as well as for communicating with node 204 over backhaul link 221 between node 202 and node 204 and/or for communicating with node 206 over backhaul link 225 between node 202 and node 206.

In another example, node 204 may utilize a common antenna array for communicating over access links 213 with mobile devices 205 of cell 271, as well as for communicating with node 202 over backhaul link 221 between node 204 and node 202 and/or for communicating with node 206 over backhaul link 223 between node 204 and node 206.

In another example, node 206 may utilize a common antenna array for communicating over access links 215 with mobile devices 207 of cell 272, as well as for communicating with node 202 over backhaul link 225 between node 202 and node 206 and/or for communicating with node 204 over backhaul link 223 between node 204 and node 206.

In some demonstrative embodiments, the at least one node of nodes 202, 204 and 206 may include an antenna array, e.g., antenna array 108 (FIG. 1), having an increased aperture, e.g., a very large aperture, which may have increased gain and/or may be configured to steer narrow beams in different angles. In one example, the antenna array, e.g., antenna array 108 (FIG. 1), may be configured to steer narrow beams in different angles in at least two dimensions, e.g., in both elevation and azimuth.

In some demonstrative embodiments, the antenna array, e.g., antenna array 108 (FIG. 1), may be configured to create multiple beams carrying different information. Accordingly, nodes 202, 204 and/or 206 may be configured to simultaneously communicate with a plurality of stations, for example, including both mobile units as well as nodes, e.g., utilizing a Multi-User (MU) Multi-Input-Multi-Output (MIMO) communication mode. In one example, the antenna array may include a modular phased antenna array, e.g., as described below.

In some demonstrative embodiments, the nodes of system 200, e.g., nodes 202, 204 and/or 206, may utilize the antenna array to perform the functionality of a self-backhauling small cell BS, for example, to facilitate mmWave communication in a large area, e.g., as described above.

In some demonstrative embodiments, the nodes of system 200, e.g., nodes 202, 204 and/or 206, may implement a time-division scheme to separate between the communications over the backhaul and access links of a wireless communication node.

In some demonstrative embodiments, the time-division scheme may be beneficial, for example, in order to avoid a situation in which a wireless communication node is required to simultaneously perform both receive and transmit operations, for example, a situation, in which the wireless communication node, e.g., node 202, is required to transmit over the access link, e.g., access link 211, at the same time when the wireless communication node, e.g., node 202, is required to receive a communication over the backhaul link, e.g., backhaul link 221 and/or backhaul link 225; and/or a situation, in which the wireless communication node, e.g., node 202, is required to receive a communication over the access link, e.g., access link 211, at the same time when the wireless communication node, e.g., node 202, is required to transmit a communication over the backhaul link, e.g., backhaul link 221 and/or backhaul link 225.

In some demonstrative embodiments, the time-division scheme may allow a wireless communication node, e.g., node 202, to support only one of the access and backhaul links at a time. Accordingly, the time-division scheme may be beneficial, for example, for using the entire antenna gain, e.g., of antenna array 108 (FIG. 1), of the wireless communication node, e.g., node 202, for the backhaul links, e.g., backhaul links 221 and/or 225, or the access links, e.g., links 211. As a result, an increased cell converge of the access links may be achieved. The increased cell coverage may allow an increased inter-small-cell distance, e.g., without affecting backhaul link performance.

In some demonstrative embodiments, system 200 may be configured to enable a node of nodes 202, 204 and/or 206 to simultaneously communicate over both the backhaul and access links, e.g., as described below. For example, node 202 may be allowed to simultaneously communicate via a common antenna array, e.g., antenna array 108 (FIG. 1), over both access links 211 as well as backhaul links 221 and/or 225.

In some demonstrative embodiments, nodes 202, 204 and/or 206 may implement an ordered communication scheme, which may define an ordering on the directionality of the communication performed by each wireless communication node.

For example, the communications of nodes 202, 204 and/or 206 may be ordered, such that a node, e.g. node 202, may be allowed to either transmit communications over both the access and backhaul links, e.g. access links 211 and backhaul links 221 and/or 225, or to receive communications over both the access and backhaul links, e.g. access links 211 and backhaul links 221 and/or 225.

In some demonstrative embodiments, nodes 202, 204 and/or 206 may include an antenna array, e.g., antenna array 108 (FIG. 1), and/or a wireless communication unit, e.g., wireless communication unit 102 (FIG. 1), configured to perform spatial multiplexing of the access and backhaul links, e.g., according to a MU-MIMO scheme.

In one example, node 202 may generate a plurality of directional beams including one or more directional beams for communicating over access links 211, e.g., for communicating access traffic to and/or from mobile devices 203; and one or more directional beams for communicating over backhaul links, e.g., two directional beams for communicating over backhaul links 221 and 225 with nodes 204 and 206.

In another example, node 204 may generate a plurality of directional beams including one or more directional beams for communicating over access links 213, e.g., for communicating access traffic to and/or from mobile devices 205; and one or more directional beams for communicating over backhaul links, e.g., two directional beams for communicating over backhaul links 221 and 223 with nodes 202 and 206.

In another example, node 206 may generate a plurality of directional beams including one or more directional beams for communicating over access links 215, e.g., for communicating access traffic to and/or from mobile devices 207; and one or more directional beams for communicating over backhaul links, e.g., two directional beams for communicating over backhaul links 225 and 223 with nodes 202 and 204.

In some demonstrative embodiments, the spatial multiplexing scheme may provide a reduced cell coverage and, accordingly, a reduced inter-small-cell distance, e.g., compared to the time-division scheme described above, for example, since spatial-multiplexing antenna signal processing may be more sensitive to interference and/or noise.

However, in some demonstrative embodiments, the spatial multiplexing scheme may provide an increased aggregate throughput per small cell, e.g., since data may be simultaneously communicated by the wireless communication node of the small cell over all the links, e.g., including both one or more of the access links as well as one or more of the backhaul links, using the MU-MIMO scheme.

Figure 3:
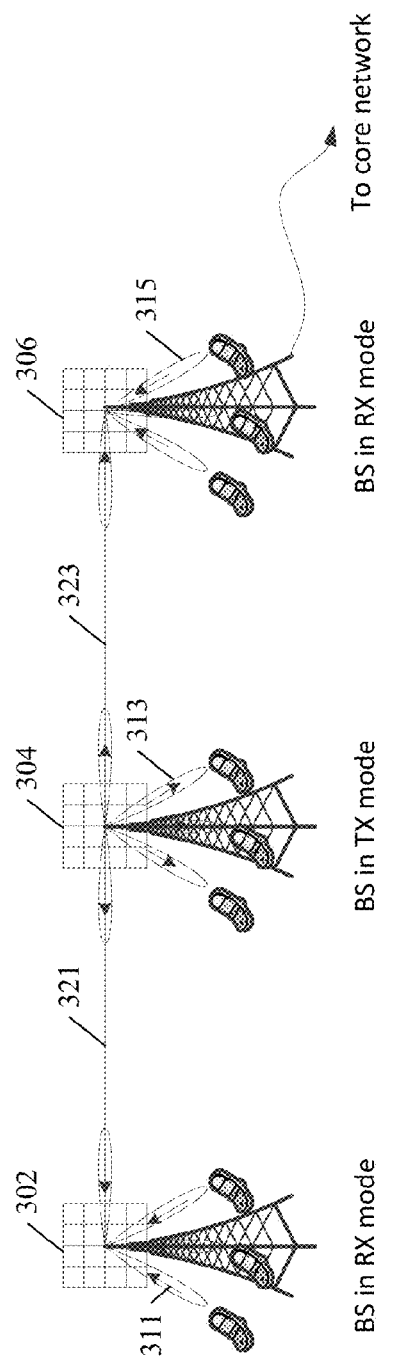
FIG. 3 is a schematic illustration of an ordered communication scheme for communication of a plurality of wireless communication nodes, in accordance with some demonstrative embodiments.

Reference is also made to FIG. 3, which schematically illustrates an ordered communication scheme 300 for communication of a first node 302, a second node 304 and a third node 306, in accordance with some demonstrative embodiments. In one example, nodes 302, 304 and/or 306 may perform the functionality of nodes 202, 204 and/or 206 (FIG. 2).

In some demonstrative embodiments, a first predefined period may be allocated, during which one or more of nodes 302, 304 and 306 may be allowed to only transmit communications over the access and/or backhaul links, and one or more other nodes of nodes 302, 304 and 306 may be allowed to only receive communications over the access and/or backhaul links.

For example, as shown in FIG. 3, during a first predefined time period, node 302 may be allowed to utilize an antenna array of node 302, e.g., antenna array 108 (FIG. 1), to only receive communications over one or more access links 311 and one or more backhaul links, e.g., a backhaul link 321 between node 302 and 304; node 304 may be allowed to utilize an antenna array of node 304 to only transmit communications over one or more access links 313 and one or more backhaul links, e.g., backhaul link 321 and/or a backhaul link 323 between nodes 304 and 306; and node 306 may be allowed to utilize an antenna array of node 306 to only receive communications over one or more access links 315 and one or more backhaul links, e.g., backhaul link 323.

In some demonstrative embodiments, a second predefined time period may be allocated, e.g., successive to the first time period. The second time period may be configured, for example, to allow a wireless communication node which, during the first time period, was allowed to transmit communication over the backhaul and access links, to receive communications over the backhaul and access links, and/or to allow a wireless communication which, during the first time period, was allowed to receive communications over the backhaul and access links, to transmit over the backhaul and access links.

For example, at least one other time period may be allocated, e.g., following the first period discussed above, during which node 302 may be allowed to utilize an antenna array of node 302, e.g., antenna array 108 (FIG. 1), to only transmit communications over one or more access links 311 and one or more backhaul links, e.g., backhaul link 321 between node 302 and 304; node 304 may be allowed to utilize an antenna array of node 304 to only receive communications over one or more access links 313 and one or more backhaul links, e.g., backhaul link 321 and/or backhaul link 323 between nodes 304 and 306; and/or node 306 may be allowed to utilize an antenna array of node 306 to only transmit communications over one or more access links 315 and one or more backhaul links, e.g., backhaul link 323.

Figure 4:
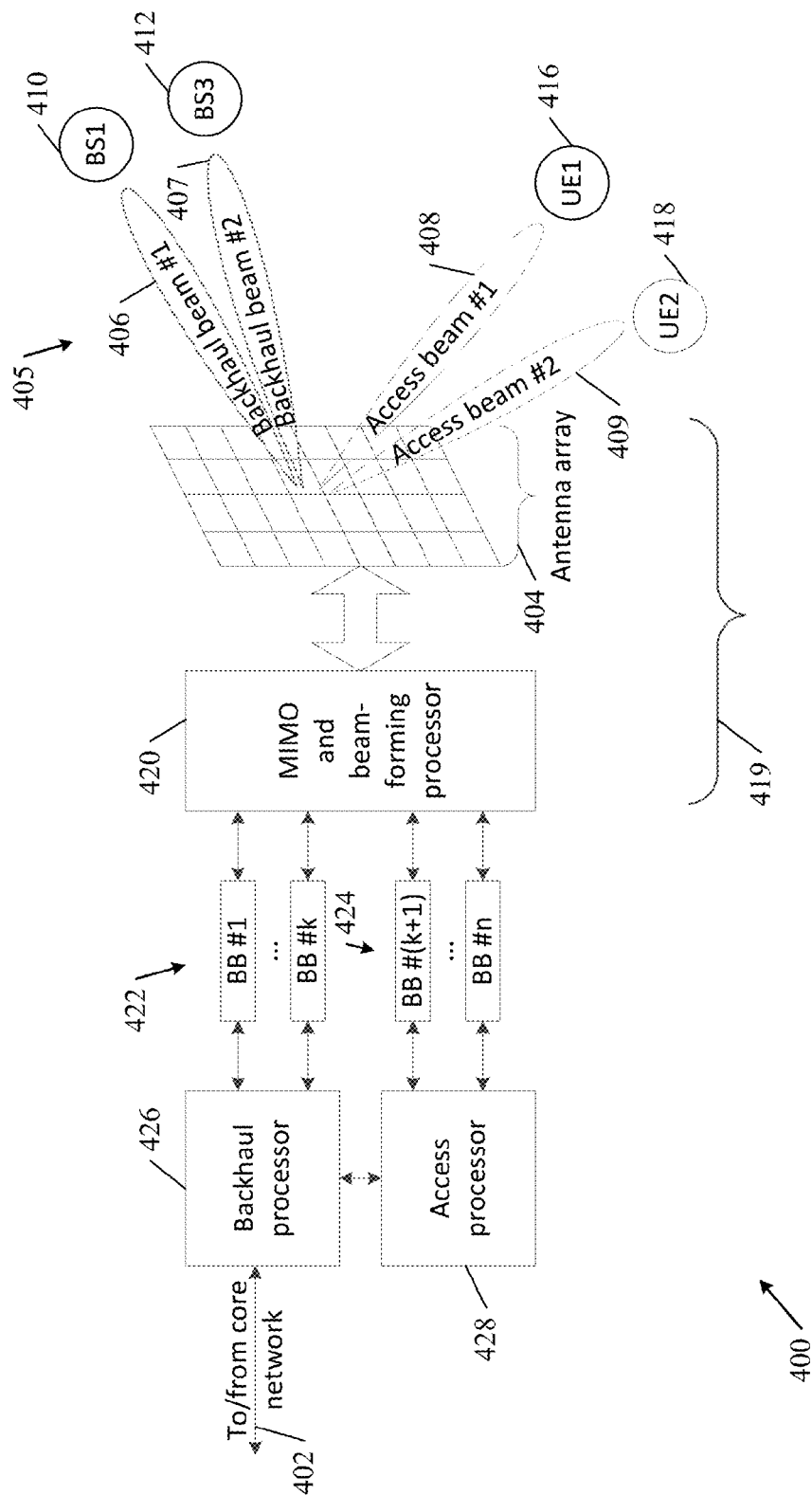
FIG. 4 is a schematic illustration of a wireless communication node, in accordance with some demonstrative embodiments.

Reference is now made to FIG. 4, which schematically illustrates a wireless communication node 400, in accordance with some demonstrative embodiments. For example, node 400 may perform the functionality of node 101 (FIG. 1), node 150 (FIG. 1), node 202 (FIG. 2), node 204 (FIG. 2), node 206 (FIG. 2), node 302 (FIG. 3), node 304 (FIG. 3) and/or node 306 (FIG. 3).

In some demonstrative embodiments, node 400 may be configured to connect to a core network via a core network connection 402. For example, node 400 may perform the functionality of node 101 (FIG. 1) or node 204 (FIG. 2).

In other embodiments, node 400 may not be connected to the core network. For example, node 400 may perform the functionality of node 150 (FIG. 1), node 202 (FIG. 2), or node 206 (FIG. 2).

In some demonstrative embodiments, node 400 may include at least one antenna array 404 to commonly form a plurality of directional beams 405, e.g., including n directional beams, wherein n is equal to or greater than two. The n directional beams 405 may include one or more backhaul beams and one or more access beams. For example, directional beams 405 may include k backhaul beams and (n-k) access beams, wherein k is equal to or greater than one. In one example, k may be greater than one.

In one example, as shown in FIG. 4, directional beams 405 may include four directional beams including two backhaul beams 406 and 407 and two access beams 408 and 409. In other embodiments, directional beams 405 may include any other number of access beams and/or any other number of backhaul beams.

In some demonstrative embodiments, node 400 may utilize the backhaul beams to communicate with one or more other nodes over one or more backhaul links. For example, node 400 may communicate with a node 410, e.g., a BS, denoted BS1, via a backhaul link over backhaul beam 406, and/or node 400 may communicate with a node 412, e.g., a BS, denoted BS3, via a backhaul link over backhaul beam 407.

In some demonstrative embodiments, node 400 may utilize the access beams to communicate with one or more mobile devices, e.g., of a cell controlled by node 400, over one or more access links. For example, node 400 may communicate with a mobile device 416, denoted UE1, via an access link over access beam 408, and/or node 400 may communicate with a mobile device 418, denoted UE2, via an access link over access beam 409.

For example, backhaul beam 406 may be formed by antenna array 404, e.g., according to a beamforming training procedure, which may be performed between node 400 and node 410; backhaul beam 407 may be formed by antenna array 404, e.g., according to a beamforming training procedure, which may be performed between node 400 and node 412; access beam 408 may be formed by antenna array 404, e.g., according to a beamforming training procedure, which may be performed between node 400 and mobile device 416; and/or access beam 409 may be formed by antenna array 404, e.g., according to a beamforming training procedure, which may be performed between node 400 and mobile device 418.

In some demonstrative embodiments, a backhaul network may include, for example, the connection to/from the core network and/or the wireless backhaul links with nodes 410 and 412. Node 400 may communicate data between the backhaul network and mobile devices 416 and 418 via access links 408 and 409.

In some demonstrative embodiments, node 400 may include a processor 420 ("MIMO and beamforming processor") to control antenna array 404 to form beams 405 and to process communications via beamformed links over beams 405, for example, according to a MIMO processing scheme, e.g., as described below.

In some demonstrative embodiments, processor 420 and antenna array 404 may be implemented as part of a modular antenna array 419, e.g., as described below with reference to FIG. 5.

In some demonstrative embodiments, node 400 may include one or more baseband (BB) processors 422, e.g., k processors 422 denoted BB#1 ... BB#k, to process communications over the plurality of backhaul beams, e.g., as described below.

In some demonstrative embodiments, node 400 may include one or more BB processors 424, e.g., n-k processors 422 denoted BB#k+1 ... BB#n, to process communications over the plurality of access beams, e.g., as described below.

In some demonstrative embodiments, node 400 may include a backhaul processor 426 to process and/or control communications over the backhaul links, and an access processor 428 to process and/or control communications over the access links, e.g., as described below.

In some demonstrative embodiments, e.g., as shown in FIG. 4, access processor 428 and backhaul processor 426 may be implemented as two separate elements of node 400. In other embodiments, access processor 428 and backhaul processor 426 may be implemented as part of a common processor or controller, e.g., a Media-Access-Control (MAC) processor of node 400.

In some demonstrative embodiments, node 400 may process data communicated from a first mobile device, e.g., mobile device 416, which may be connected to node 400 via an access beam, e.g., access beam 408, to another mobile device ("the destination mobile device"). In one example, the destination mobile device may be connected to node 400. For example, the destination mobile device may include UE2 connected to node 400 via access beam 409. In another example, the destination mobile device may be connected to another node, e.g., to BS1, which in turn may be connected to node 400 over a backhaul beam, e.g., backhaul beam 406.

In some demonstrative embodiments, node 400 may receive a data signal from mobile device 416 via access beam 408.

In some demonstrative embodiments, processor 420 may separate the data signal from other signals, e.g., backhaul signals and/or access signals received over other beams of beams 405.

In some demonstrative embodiments, a BB processor of BB processors 424 corresponding to access beam 408, e.g., BB#k+1, may decode the separated signal.

In some demonstrative embodiments, access processor 428 may receive the decoded data, and may control forwarding of the decoded data towards the destination mobile device.

In one example, the destination mobile device is connected to node 400, e.g., the destination mobile device includes mobile device 418 connected to node 400 over the access beam 409. According to this example, access processor 428 may select to send the decoded data to a baseband processor of BB processors 424, e.g. the BB #n, corresponding to access beam 409. The BB processor BB#n may encode the data for transmission to mobile device 418 over the access beam 409 formed by antenna array 404.

In another example, the destination mobile device is connected to another node, e.g., to BS1 410, which may be connected to node 400 via a backhaul beam, e.g., backhaul beam 406. According to this example, access processor 428 may send the data received from UE1 to backhaul processor 426. Backhaul processor 426 may send the data to a BB processor 422, e.g., the BB #1, corresponding to the backhaul link of the other node. The BB processor BB#1 may encode and modulate the data for transmission to node 410 over backhaul beam 406 formed by antenna array 404.

In another example, the destination mobile device may be connected to a remote node, which may communicate with node 400 over the core network. According to this example, access processor 428 may send the data to backhaul processor 426, and backhaul processor 426 may forward the data to the core network, e.g., via connection 402.

In some demonstrative embodiments, node 400 may communicate data intended for the UE1, e.g., by reversing the operations described above.

In some demonstrative embodiments, backhaul processor 426 may be configured to distribute traffic between one or more other nodes connected to node 400 via wire, e.g., via the core network, or wirelessly, e.g., via the backhaul links.

In one example, node 400 may forward traffic received from a first node, e.g., node 410, connected to node 400 via a first backhaul beam, e.g., backhaul beam 406, to a second node, e.g., node 412, connected to node 400 via a second backhaul beam, e.g., backhaul beam 407. According to this example, node 400 may receive a data signal from node 410 via backhaul beam 406, and processor 420 may separate the data signal from other signals, e.g., access signals and/or backhaul signals received via other beams of beams 405. A BB processor of BB processors 422 corresponding to backhaul beam 406, e.g., BB#1, may decode the separated signal. Backhaul processor 426 may receive the decoded data, and may forward the decoded data to a BB processor 422 corresponding to backhaul beam 407, e.g., the BB #k. The BB processor 422 may encode, modulate and transmit the data to node 412 over backhaul beam 407.

In another example, node 400 may be configured to forward traffic from the core network to a node, e.g., node 410, connected to node 400 via a wireless backhaul beam, e.g., over beam 406.

For example, backhaul processor 426 may receive the data from the core network, e.g., via connection 402. Backhaul processor 426 may forward the data to be processed by a BB processor of BB processors 422, e.g., BB#1, corresponding to backhaul beam 406. BB processor BB#1 may encode, modulate and transmit the data to node 410 over backhaul beam 406.

In some demonstrative embodiments, node 400 may communicate data from node 410 to the core network, e.g., by reversing the operations described above.

Following is a description of a modular antenna array, which may be utilized by one or more of the nodes of FIGS. 1, 2, 3 and/or 4, in accordance with some demonstrative embodiments. In other embodiments, any other suitable antenna array may be used. For example, the modular antenna array may perform the functionality of antenna array 108 (FIG. 1) and/or antenna array 404 (FIG. 4). In some demonstrative embodiments, the modular antenna array may also perform shared MIMO and/or beamforming processing for a plurality of beams, e.g., the modular antenna array may perform the functionality of processor 420 (FIG. 4).

In some demonstrative embodiments, an antenna array may include a modular architecture configured to synthesize larger composite antenna arrays from smaller sub-array antenna modules. A combination of RF beamforming in the sub-array antenna modules and baseband beamforming between sub-array antenna modules may provide, for example, increased beamforming capabilities, for example, in terms of beam width, gain, coverage and beam steering. The antenna array may be configured, for example, to operate in the mmWave region of the RF spectrum and, in particular, the 60 GHz region associated with the use of, for example, wireless personal area network (WPAN) and wireless local area network (WLAN) communication systems.

Figure 5:
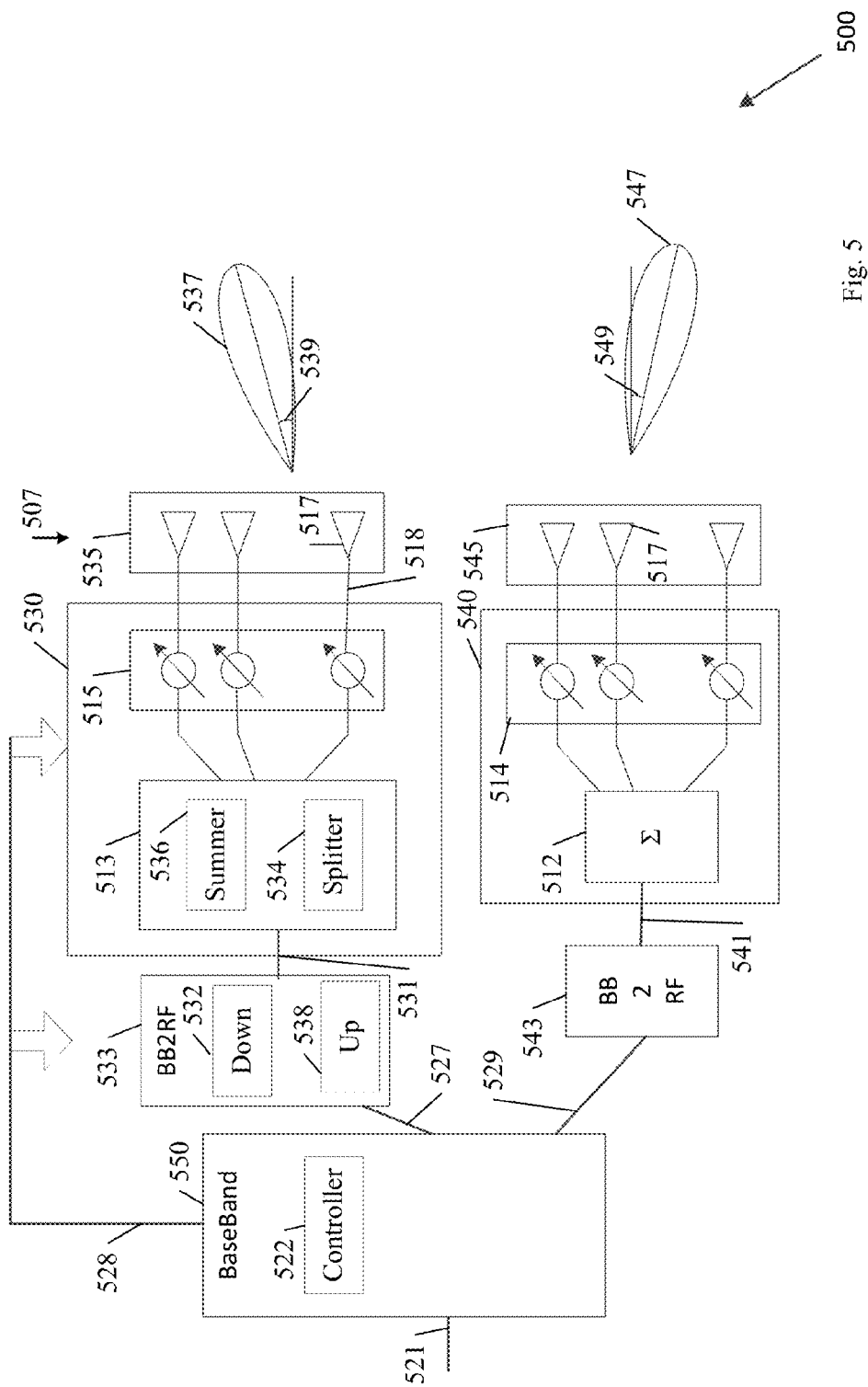
FIG. 5 is a schematic illustration of a modular antenna array, in accordance with some demonstrative embodiments.

Reference is now made to FIG. 5, which schematically illustrates a modular antenna array 500, in accordance with some demonstrative embodiments.

In some demonstrative embodiments, modular antenna array 500 may include at least one antenna array 507 including a plurality of antenna elements 517. The plurality of antenna elements 517 may be configured, for example, for creation of a highly directional antenna pattern. The plurality of antenna elements 517 may include, for example, about 16-36 antenna elements, or any other number of antenna elements, which may be placed in a predefined geometry. The plurality of antenna elements 517 may be configured to form a plurality of highly directive antenna patterns or beams, which may be steered by setting appropriate signal phases at antenna elements 517, e.g., as described below.

In some demonstrative embodiments, array 507 may include a plurality of antenna subarrays. For example, array 507 may include a first antenna subarray 535, and a second antenna subarray 545. In other embodiments, array 507 may include any other number of antenna subarrays, e.g., more than two antenna subarrays.

The phrase "antenna subarray" as used herein may relate to a group of antenna elements of the plurality of antenna elements 517, which may be coupled, for example, to a common RF chain. In one example, array 507 may include an antenna array, which may be divided into a plurality of, e.g., independent subarrays, each capable of independently generating a directional beam. In another example, array 507 may include a plurality of different antenna arrays to generate a plurality of directional beams. One or more of the different antenna arrays may be divided into two or more subarrays.

In some demonstrative embodiments, first antenna subarray 535 may include a first plurality of antenna elements of the plurality of antenna elements 517 configured to form a first directional beam 537 directed in a first direction 539.

In some demonstrative embodiments, second antenna subarray 545 may include a second, e.g., different, plurality of antenna elements of the plurality of antenna elements 517 configured to form a second directional beam 547 directed in a second direction 549.

Some demonstrative embodiments are described herein with respect to a modular antenna array, e.g., modular antenna array 500, including two sub-arrays, e.g., antenna sub-arrays 535 and 545, configured to form two directional beams. However, in other embodiments, the modular antenna array may include any other plurality of antenna-sub-arrays to form any other plurality of directional beams. For example, antenna array 404 (FIG. 4) may include n antenna sub-arrays to form the n directional beams 405 (FIG. 4).

In some demonstrative embodiments, modular antenna array 500 may include a plurality of Radio Frequency (RF) chains configured to control the first and second pluralities of antenna elements of antenna subarrays 535 and 545.

In some demonstrative embodiments, the plurality of RF chains may be coupled to the plurality of antenna subarrays. For example, modular antenna array 500 may include a first RF chain 530 connected to first antenna subarray 535, and a second RF chain 540 connected to second antenna subarray 545. In other embodiments, modular antenna array 500 may include any other number of RF chains coupled to the any other number of the plurality of antenna subarrays, e.g., more than two RF chains connected to more than two antenna subarrays.

In some demonstrative embodiments, RF chains 530 and/or 540 may include or may be included as part of a radio frequency integrated circuit (RFIC), which may be connected to antenna subarrays 535 and 545 through a plurality of feed lines 518, which may be, for example, micro-strip feed lines.

In some demonstrative embodiments, the plurality of RF chains may enable processing of two or more independent RF signals, e.g., carrying different data. For example, RF chain 530 may process an RF signal 531, and RF chain 540 may process an RF signal 541.

In some demonstrative embodiments, RF chain 530 may include a plurality of phase shifters 515 configured to adjust the phases of the antenna elements of antenna subarray 535. For example, a phase shifter of phase shifters 515 may be configured to adjust the phase of a corresponding antenna element of antenna subarray 535.

For example, phases of the antenna elements of antenna subarrays 535 may be shifted, e.g., by phase shifters 515, to provide a constructive and/or destructive interference, configured to change the beamforming scheme of antenna subarray 535 and to change the direction of directional beam 537.

In some demonstrative embodiments, RF chain 540 may include a plurality of phase shifters 514 configured to adjust the phases of the antenna elements of antenna subarray 545. For example, a phase shifter of phase shifters 514 may be configured to adjust the phase of a corresponding antenna element of antenna subarray 545.

For example, phases of the antenna elements of antenna subarrays 545 may be shifted, e.g., by phase shifters 514, to provide a constructive and/or destructive interference, configured to change the beamforming scheme of antenna subarray 545 and to change the direction of directional beam 547.

Phase shifters 515 and/or 514 may be discrete, e.g., configured to rotate the phase of the antenna elements of antenna subarrays 535 and/or 545 to a limited set of values, for example, 0, $\pm\pi/2$, and $\pi$, allowing only a relatively coarse beamforming for changing a direction of directional beams 537 and/or 547.

In some demonstrative embodiments, RF chain 530 may include a summer/splitter block 513 coupled to phase shifters 515 and/or RF chain 540 may include a summer/splitter block 512 coupled to phase shifters 514.

In some demonstrative embodiments, summer/splitter block 513 may include a splitter 534, e.g., a multiplexer, configured to reproduce and split RF signal 531 between the antenna elements of antenna subarray 535 and to couple the reproduced signals of RF signal 531 to phase shifters 515, e.g., when transmitting RF signal 531 via beam 537.

In some demonstrative embodiments, summer/splitter block 513 may include a summer 536 configured to sum into RF signal 531 signals received from the antenna elements of antenna subarray 535, e.g., when receiving RF signal 531 via beam 537.

In some demonstrative embodiments, utilizing two or more RF chains may enable baseband processing of two or more independent signals, e.g., carrying different data, communicated via two or more directional beams. In contrast, utilizing a single RF chain may enable baseband processing of only one signal, e.g., even if a large number of antenna elements 517 are utilized.

For example, RF chains 530 and 540 may enable baseband processing, e.g., independent baseband processing, of RF signals 531 and 541 communicated via directional beams 537 and 547.

In some demonstrative embodiments, RF signal 531 may include data communicated via an access link, e.g., access link 103 (FIG. 1), over beam 537, and RF signal 541 may include data communicated via a backhaul link, e.g., backhaul link 119 (FIG. 1), over beam 547.

In some demonstrative embodiments, modular antenna array 500 may utilize the two or more RF chains to perform beamformed diversity communication, e.g., as described below.

The phrase "beamformed diversity communication", as used herein may relate to any communication utilizing a plurality of beams.

In some demonstrative embodiments, modular antenna array 500 may include a baseband 550 configured to control antenna subarrays 535 and 545 to form directional beams 537 and 547 directed to directions 539 and 549 for communicating a MIMO wireless transmission.

In some demonstrative embodiments, baseband 550 may process data 521 corresponding to the MIMO wireless transmission communicated utilizing a MIMO beamformed scheme, e.g., as described below.

In some demonstrative embodiments, data 521 may include data communicated over one or more backhaul links, e.g., backhaul link 119 (FIG. 1), and one or more access links, e.g., access link 103 (FIG. 1).

For example, input data 521 may include one or more data streams processed by BB processors 422 (FIG. 4) for transmission over one or more of beams 406 and 407 (FIG. 4); one or more data streams received over one or more of beams 406 and 407 (FIG. 4) and processed by BB processors 422 (FIG. 4); one or more data streams processed by BB processors 424 (FIG. 4) for transmission over one or more of beams 408 and 409 (FIG. 4); and/or one or more data streams received over one or more of beams 408 and 409 (FIG. 4) and processed by BB processors 424 (FIG. 4), e.g., as described above.

Some demonstrative embodiments are described herein with reference to a wireless communication unit, e.g., modular antenna array 500, configured to perform both transmission and reception of a MIMO beamformed communication. Other embodiments may include a wireless communication unit capable of performing only one of transmission and reception of a MIMO beamformed communication.

Some demonstrative embodiments are described herein with reference to a communication system, e.g., wireless communication system 500, wherein both the TX side and the RX side utilize a plurality of antenna subarrays to communicate a MIMO transmission. However, other embodiments may be implemented with respect to systems configured to communicate any other diversity communication, for example, systems in which only one of the Tx and Rx sides utilizes a plurality of antenna subarrays, e.g., to form a Single-Input-Multi-Output (SIMO) and/or a Multi-Input-Single-Output (MISO) beamformed link. For example, one of the Tx and Rx sides may utilize an omni-directional antenna, and another one of the Tx and Rx sides may utilize a multi-array transceiver, e.g., modular antenna array 500.

In some demonstrative embodiments, modular antenna array 500 may include a plurality of baseband (BB) to RF (BB2RF) converters interfacing between the plurality of RF chains and baseband 550. For example, modular antenna array 500 may include BB2RF converters 533 interfacing between RF chain 530 and baseband 550, and BB2RF converters 543 interfacing between RF chain 540 and baseband 550. In other embodiments, modular antenna array 500 may include any other number of BB2RF convertors connecting between baseband 550 and any other number of RF chains, e.g., more than two.

In some demonstrative embodiments, BB2RF converter 533 may convert RF signal 531 into baseband data signal 527 and vice versa, and/or BB2RF converters 543 may convert RF signal 541 into baseband data signal 529 and vice versa.

In one example, BB2RF converter 533 may convert RF signal 531 into baseband data signal 527, and/or BB2RF converter 543 may convert RF signal 541 into baseband data signal 529, e.g., if modular antenna array 500 receives the MIMO wireless transmission via beams 537 and/or 547.

In another example, BB2RF converter 533 may convert baseband data signal 527 into RF signal 531 and/or BB2RF converter 543 may convert baseband data signal 529 into RF signal 541, e.g., if modular antenna array 500 transmits the MIMO wireless transmission via beams 537 and/or 547.

In some demonstrative embodiments, BB2RF converters 533 and/or 543 may include down-converters, configured to convert an RF signal into a baseband data signal, and to provide the baseband data signal to baseband 550, e.g., if modular antenna array 500 receives the MIMO wireless transmission.

For example, BB2Rf converter 533 may include a down converter 532 configured to down-convert RF signal 531 into data signal 527, and to provide data signal 527 to baseband 550.

In some demonstrative embodiments, baseband to RF converters 533 and/or 543 may include up-converters, configured to convert a baseband data signal into an RF signal and to provide the RF signal to an RF chain, e.g., if modular antenna array 500 transmits the MIMO wireless transmission.

For example, BB2RF converter 533 may include an up-converter 538 configured to up-convert data signal 527 into RF signal 531 and to provide RF signal 531 to RF chain 530.

In some demonstrative embodiments, modular antenna array 500 may be configured to perform hybrid beamforming. The hybrid beamforming may include, for example, performing a coarse beamforming in RF chains 530 and/or 540, e.g., using phase-shifters 539 and/or 549; and fine beamforming in baseband 550, e.g., as described below.

In one example, the coarse beamforming may be performed, for example, as part of a beamforming procedure for setting up a beamformed link.

In some demonstrative embodiments, the fine beamforming may include diversity processing, e.g., MIMO processing, MISO processing and/or SIMO processing, at baseband 550. For example, the MIMO processing may include, for example, closed-loop (CL) MIMO processing, Open Loop (OL) MIMO processing, Space-Block Code (SBC) MIMO processing, e.g., Space Time Block Code (STBC) MIMO processing, Space Frequency Block Code (SFBC) MIMO processing, and the like.

In some demonstrative embodiments, modular antenna array 500 may include a controller 522 configured to control RF Chains 535 and 545 and baseband 550 to perform the coarse beamforming and/or the fine beamforming.

In some demonstrative embodiments, controller 522 may control antenna subarrays 535 and/or 545 utilizing a control signal 528 carrying the amount of phase shift to be applied to one or more phase shifters of phase shifters 515 and/or 514.

In some demonstrative embodiments, the phase shift adjustments to phase shifters 515 may determine and/or control the beam width, gain and/or direction of directional beam 537 formed by antenna subarray 535.

In some demonstrative embodiments, the phase shift adjustments to phase shifters 514 may determine and/or control the beam width, gain and/or direction of directional beam 547 forms by antenna subarray 545.

In some demonstrative embodiments, each phase shifter of an antenna element of antenna subarrays 535 and/or 545 may perform a local phase adjustment to a signal to create a phase distribution across antenna elements to steer a beam in a desired direction.

In some demonstrative embodiments, control signal 528 may include weighting coefficients, which may be generated and/or derived from controller 522, configured to steer directional beams 537 and/or 547.

In some demonstrative embodiments, controller 522 may provide via control signal 528 a first set of weighting coefficients to phase shifters 515 configured to form a local phase adjustment to one or more antenna elements of antenna subarray 535, resulting in directing beam 537 to direction 539.

In some demonstrative embodiments, controller 522 may provide via control signal 528 a second, e.g., different set of weighting coefficients, to phase shifters 514 configured to form a local phase adjustment to one or more antenna elements of antenna subarray 545, resulting in directing beam 547 to direction 549.

In some demonstrative embodiments, modular antenna array 500 may be utilized by a node, e.g., node 400 (FIG. 4), to form a plurality of independent directional communication beams, e.g., beams 405 (FIG. 4), including one or more access beams, e.g., beams 408 and 409 (FIG. 4), and one or more backhaul beams, e.g., beams 406 and 407 (FIG. 4).

In some demonstrative embodiments, a plurality of different signals, e.g., signals corresponding to BB processors 422 and 424 (FIG. 4), may be communicated via a plurality of beamformed links formed by the plurality of beamformed beams. Each beamformed link, which corresponds to an antenna subarray of the plurality of antenna subarrays, may communicate a signal, for example, via a plurality of antenna elements of the antenna subarray.

For example, a first signal, e.g., signal 527, may be communicated via a first beamformed link formed by directional beam 537 generated by antenna subarray 535, and a second, e.g., different signal, for example, signal 529, may be communicated via a second beamformed link formed by directional beam 547 generated by antenna subarray 545.

Figure 6:
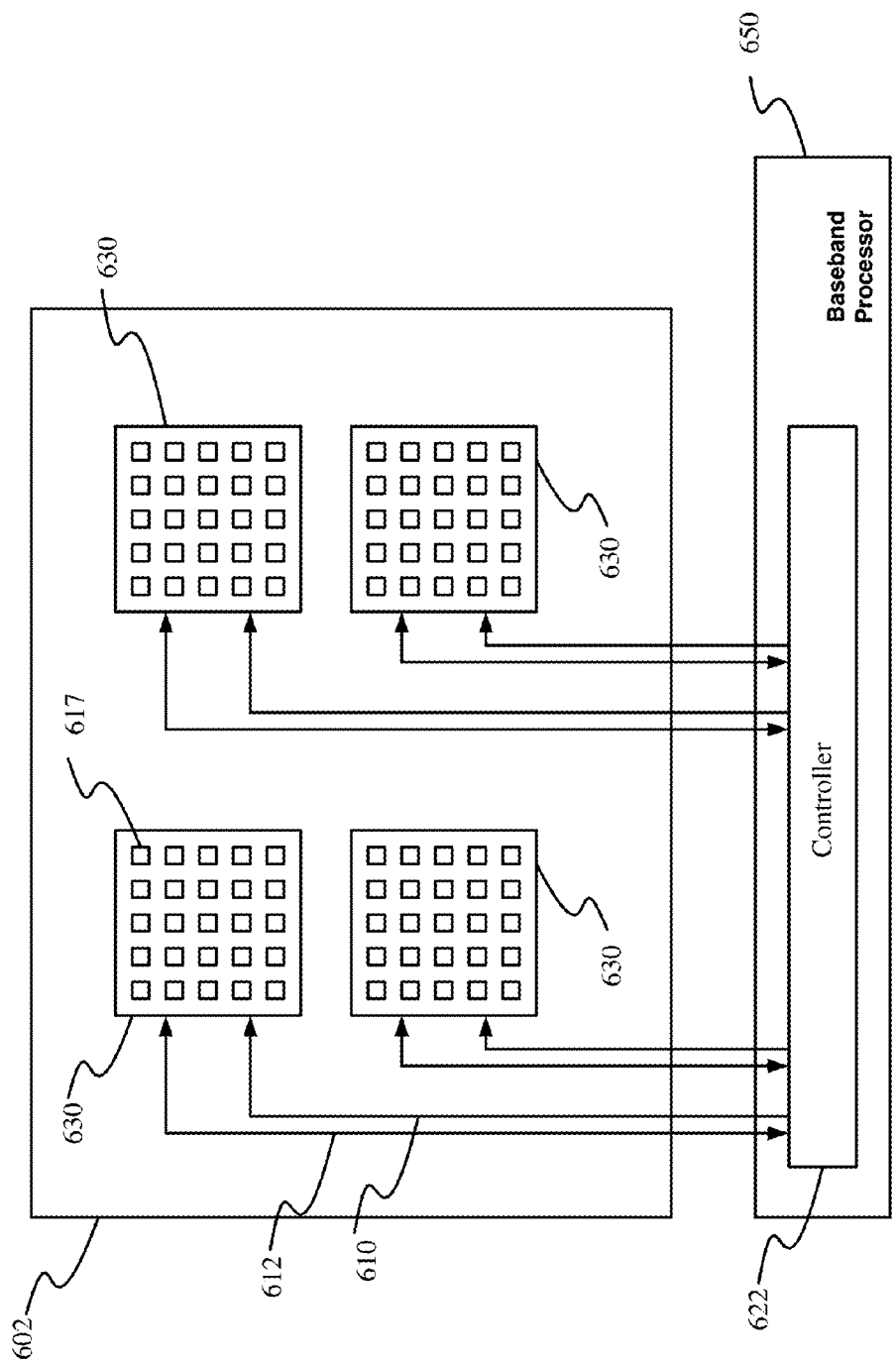
FIG. 6 is a schematic illustration of a planar modular antenna array, in accordance with some demonstrative embodiments.

Reference is now made to FIG. 6, which schematically illustrates a planar modular antenna array 602, in accordance with some demonstrative embodiments. For example, planar antenna array 602 may perform the functionality of modular antenna array 500 (FIG. 5).

In some demonstrative embodiments, planar antenna array 600 may include a planar array of antenna modules 630, e.g., arranged in a two-dimensional array. For example, antenna modules 630 may be arranged in one or more rows, e.g., two rows, and one or more columns, e.g., two columns.

In some demonstrative embodiments, an antenna module 630 may include a plurality of antenna elements 617, e.g., including antenna elements 517 (FIG. 5).

In some demonstrative embodiments, antenna elements 617 of an antenna module 630 may be arranged in a two-dimensional array. For example, antenna elements 617 of the antenna module 630 may be arranged in one or more rows, e.g., two or more rows, and one or more columns, e.g., two or more columns.

In some demonstrative embodiments, antenna module 630 may also include an RF chain, e.g., RF chain 530 (FIG. 5) or RF chain 540 (FIG. 5), to control antenna elements 617, e.g., as described above with reference to FIG. 5.

For example, antenna modules 630 may be controlled by a controller 622 via control links 610. Controller 622 may be implemented, for example, as part of a BB 650. For example, controller 620 may perform the functionality of controller 522 (FIG. 5) and/or BB 650 may perform the functionality of BB 550 (FIG. 5). Data links 612 may transfer data signals between BB 650 and modules 630. For example, control links 610 may transfer control signals 528 (FIG. 5), and/or data links may transfer data signals 527 and/or 529 (FIG. 5).

In some demonstrative embodiments, the planar arrangement of antenna modules 630 and the planar arrangement of antenna elements 617 may be advantageous, for example, for beam steering in two dimensions, e.g., azimuth and elevation and/or any other dimensions.

Figure 7:
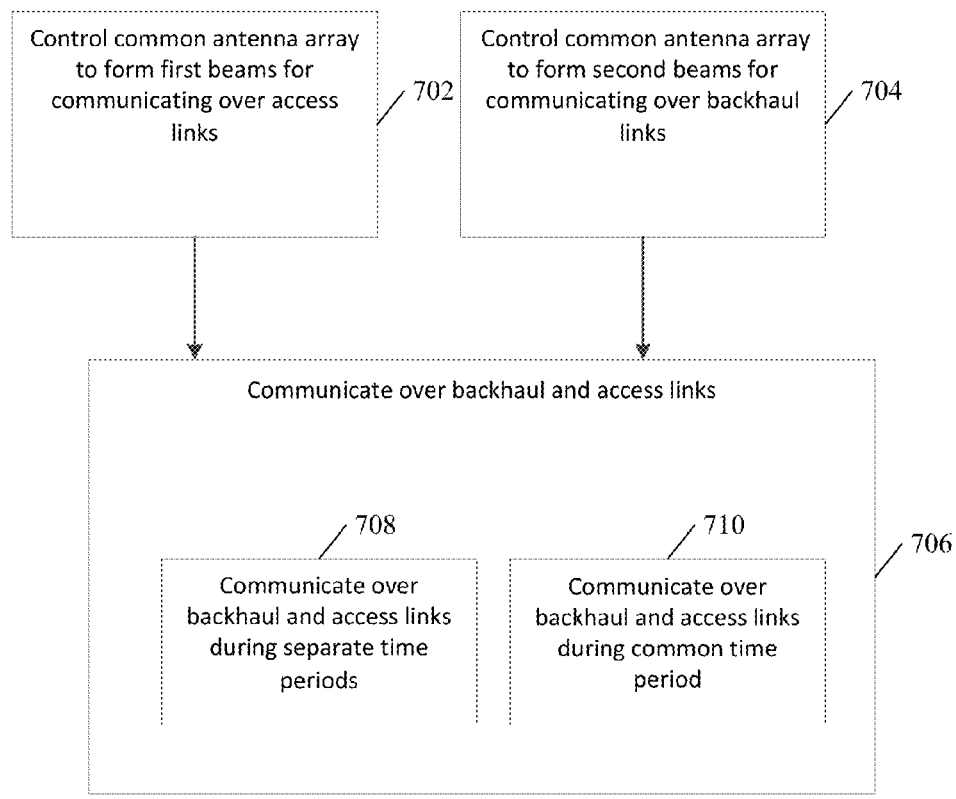
FIG. 7 is a schematic flow-chart illustration of a method of wireless backhaul and access communication, in accordance with some demonstrative embodiments.

Reference is now made to FIG. 7, which schematically illustrates a method of wireless backhaul and access communication, in accordance with some demonstrative embodiments. For example, one or more of the operations of the method of FIG. 7 may be performed by a wireless communication system, e.g., system 100 (FIG. 1); a wireless communication node, e.g., node 101 (FIG. 1); and/or a wireless communication unit, e.g., wireless communication units 102 (FIG. 1).

As indicated at block 702, the method may include controlling an antenna array of a wireless communication node to form one or more first beams for communicating over one or more wireless access links between the wireless communication node and one or more mobile devices. For example, wireless communication unit 102 (FIG. 1) may control antenna array 108 (FIG. 1) to form a directional beam for communicating over access link 103 (FIG. 1) between wireless communication node 101 (FIG. 1) and mobile device 140 (FIG. 1), e.g., as described above.

As indicated at block 704, the method may include controlling the antenna array to form one or more second beams for communicating over one or more wireless backhaul links between the wireless communication node and one or more other wireless communication nodes. For example, wireless communication unit 102 (FIG. 1) may control antenna array 108 (FIG. 1) to form a directional beam for communicating over backhaul link 119 (FIG. 1) between wireless communication node 101 (FIG. 1) and mobile device 140 (FIG. 1), e.g., as described above.

As indicated at block 706, the method may include communicating over the backhaul and access links.

As indicated at block 708, communicating over the backhaul and access links may include communicating over the backhaul and access links during separate time periods. For example, wireless communication unit 102 (FIG. 1) may control antenna array 108 (FIG. 1) to communicate over links 103 and 119 during separate time periods, e.g., as described above.

As indicated at block 710, communicating over the backhaul and access links may include communicating over the backhaul and access links during a common time period. For example, wireless communication unit 102 (FIG. 1) may control antenna array 108 (FIG. 1) to communicate over links 103 and 119 during a common time periods, e.g., as described above with reference to FIG. 3.

Figure 8:
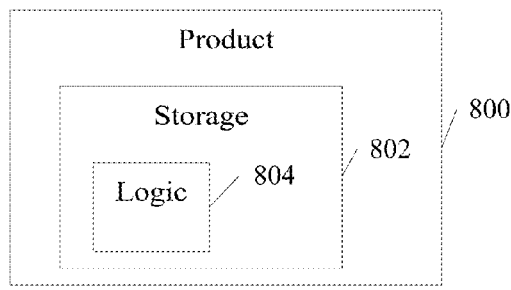
FIG. 8 is a schematic illustration of a product of manufacture, in accordance with some demonstrative embodiments.

Reference is made to FIG. 8, which schematically illustrates a product of manufacture 800, in accordance with some demonstrative embodiments. Product 800 may include a non-transitory machine-readable storage medium 802 to store logic 804, which may be used, for example, to perform at least part of the functionality of wireless communication node 101 (FIG. 1), wireless communication unit 102 (FIG. 1), wireless communication nodes 202, 204, and/or 206 (FIG. 2), wireless communication nodes 302, 304 and/or 306 (FIG. 3) and/or wireless communication node 400 (FIG. 4), and/or to perform one or more operations of the method of FIG. 7. The phrase "non-transitory machine-readable medium" is directed to include all computer-readable media, with the sole exception being a transitory propagating signal.

In some demonstrative embodiments, product 800 and/or machine-readable storage medium 802 may include one or more types of computer-readable storage media capable of storing data, including volatile memory, non-volatile memory, removable or non-removable memory, erasable or non-erasable memory, writeable or re-writeable memory, and the like. For example, machine-readable storage medium 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 804 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus of wireless communication, the apparatus comprising a wireless communication unit to control an antenna array to form one or more first beams for communicating over one or more access links and to form one or more second beams for communicating over one or more backhaul links, the access links including wireless communication links between a wireless communication node and one or more mobile devices, and the backhaul links including wireless communication links between the wireless node and one or more other wireless communication nodes.

Example 2 includes the subject matter of Example 1 and optionally, wherein the wireless communication unit is to control the antenna array to communicate over the backhaul and access links during separate time periods.

Example 3 includes the subject matter of Example 1 and optionally, wherein the wireless communication unit is to control the antenna array to communicate over the backhaul and access links during a common time period.

Example 4 includes the subject matter of Example 3 and optionally, wherein the wireless communication unit is to control the antenna array to communicate over the backhaul and access links according to a Multi-User (MU) Multi-Input-Multi-Output (MIMO) scheme.

Example 5 includes the subject matter of Example 3 or 4 and optionally, wherein the wireless communication unit is to control the antenna array to transmit communications over the backhaul and access links during a first common time period, and to receive communications over the backhaul and access links during a second common time period.

Example 6 includes the subject matter of any one of Examples 1-5 and optionally, wherein the backhaul links comprise links for communicating traffic between the mobile devices and a core network.

Example 7 includes the subject matter of any one of Examples 1-6 and optionally, wherein the controller is to control one or more first sub-arrays of the antenna array to form the one or more first beams, and to control one or more second sub-arrays of the antenna array to form the one or more second beams.

Example 8 includes the subject matter of any one of Examples 1-7 and optionally, wherein the access links and backhaul links comprise beamformed links.

Example 9 includes the subject matter of any one of Examples 1-8 and optionally, wherein the access links and backhaul links comprise links over a millimeter-wave (mmWave) band or a directional multi-gigabit (DMG) band.

Example 10 include a wireless communication system comprising at least one wireless communication node to communicate with one or more mobile devices of a wireless communication cell, the wireless communication node comprising an antenna array; and a wireless communication unit to control the antenna array to form one or more first beams for communicating over one or more access links and to form one or more second beams for communicating over one or more backhaul links, the access links including wireless communication links between the wireless communication node and the mobile devices of the wireless communication cell, and the backhaul links including wireless communication links between the wireless communication node and one or more other wireless communication nodes of one or more other wireless communication cells.

Example 11 includes the subject matter of Example 10 and optionally, wherein the wireless communication unit is to control the antenna array to communicate over the backhaul and access links during separate time periods.

Example 12 includes the subject matter of Example 10 and optionally, wherein the wireless communication unit is to control the antenna array to communicate over the backhaul and access links during a common time period.

Example 13 includes the subject matter of Example 12 and optionally, wherein the wireless communication unit is to control the antenna array to communicate over the backhaul and access links according to a Multi-User (MU) Multi-Input-Multi-Output (MIMO) scheme.

Example 14 includes the subject matter of Example 12 or 13 and optionally, wherein the wireless communication unit is to control the antenna array to transmit communications over the backhaul and access links during a first common time period, and to receive communications over the backhaul and access links during a second common time period.

Example 15 includes the subject matter of any one of Examples 10-14 and optionally, wherein the backhaul links comprise links for communicating traffic between the mobile devices and a core network.

Example 16 includes the subject matter of any one of Examples 10-15 and optionally, wherein the controller is to control one or more first sub-arrays of the antenna array to form the one or more first beams, and to control one or more second sub-arrays of the antenna array to form the one or more second beams.

Example 17 includes the subject matter of any one of Examples 10-16 and optionally, wherein the access links and backhaul links comprise beamformed links.

Example 18 includes the subject matter of any one of Examples 10-17 and optionally, wherein the access links and backhaul links comprise links over a millimeter-wave (mmWave) band or a directional multi-gigabit (DMG) band.

Example 19 includes the subject matter of any one of Examples 10-18 and optionally comprising a plurality of wireless communication nodes forming a plurality of wireless communication cells, the plurality of wireless communication nodes to communicate over a backhaul network formed by a plurality of wireless backhaul links between the plurality of wireless communication nodes.

Example 20 includes the subject matter of any one of Examples 10-19 and optionally, wherein the wireless communication node comprises a Base Station (BS).

Example 21 includes a product including a non-transitory storage medium having stored thereon instructions that, when executed by a machine, result in controlling an antenna array of a wireless communication node to form one or more first beams for communicating over one or more wireless access links between the wireless communication node and one or more mobile devices; and controlling the antenna array to form one or more second beams for communicating over one or more wireless backhaul links between the wireless communication node and one or more other wireless communication nodes.

Example 22 includes the subject matter of Example 21 and optionally, wherein the instructions result in communicating over the backhaul and access links during separate time periods.

Example 23 includes the subject matter of Example 21 and optionally, wherein the instructions result in communicating over the backhaul and access links during a common time period.

Example 24 includes the subject matter of Example 23 and optionally, wherein the instructions result in communicating over the backhaul and access links according to a Multi-User (MU) Multi-Input-Multi-Output (MIMO) scheme.

Example 25 includes the subject matter of Example 23 or 24 and optionally, wherein the instructions result in transmitting communications over the backhaul and access links during a first common time period, and receiving communications over the backhaul and access links during a second common time period.

Example 26 includes the subject matter of any one of Examples 21-25 and optionally, wherein the backhaul links comprise links for communicating traffic between the mobile devices and a core network.

Example 27 includes the subject matter of any one of Examples 21-26 and optionally, wherein the instructions result in controlling one or more first sub-arrays of the antenna array to form the one or more first beams, and controlling one or more second sub-arrays of the antenna array to form the one or more second beams.

Example 28 includes the subject matter of any one of Examples 21-27 and optionally, wherein the access links and backhaul links comprise beamformed links.

Example 29 includes the subject matter of any one of Examples 21-28 and optionally, wherein the access links and backhaul links comprise links over a millimeter-wave (mm-Wave) band or a directional multi-gigabit (DMG) band.

Example 30 includes a method of wireless communication, the method comprising controlling an antenna array of a wireless communication node to form one or more first beams for communicating over one or more wireless access links between the wireless communication node and one or more mobile devices; and controlling the antenna array to form one or more second beams for communicating over one or more wireless backhaul links between the wireless communication node and one or more other wireless communication nodes.

Example 31 includes the subject matter of Example 30 and optionally comprising communicating over the backhaul and access links during separate time periods.

Example 32 includes the subject matter of Example 30 and optionally comprising communicating over the backhaul and access links during a common time period.

Example 33 includes the subject matter of Example 32 and optionally comprising communicating over the backhaul and access links according to a Multi-User (MU) Multi-Input-Multi-Output (MIMO) scheme.

Example 34 includes the subject matter of Example 32 or 33 and optionally comprising transmitting communications over the backhaul and access links during a first common time period, and receiving communications over the backhaul and access links during a second common time period.

Example 35 includes the subject matter of any one of Examples 30-34 and optionally, wherein the backhaul links comprise links for communicating traffic between the mobile devices and a core network.

Example 36 includes the subject matter of any one of Examples 30-35 and optionally comprising controlling one or more first sub-arrays of the antenna array to form the one or more first beams, and controlling one or more second sub-arrays of the antenna array to form the one or more second beams.

Example 37 includes the subject matter of any one of Examples 30-36 and optionally, wherein the access links and backhaul links comprise beamformed links.

Example 38 includes the subject matter of any one of Examples 30-37 and optionally, wherein the access links and backhaul links comprise links over a millimeter-wave (mm-Wave) band or a directional multi-gigabit (DMG) band.

Example 39 includes an apparatus of wireless communication, the apparatus comprising means for controlling an antenna array of a wireless communication node to form one or more first beams for communicating over one or more wireless access links between the wireless communication node and one or more mobile devices, and controlling the antenna array to form one or more second beams for communicating over one or more wireless backhaul links between the wireless communication node and one or more other wireless communication nodes.

Example 40 includes the subject matter of Example 39 and optionally comprising means for communicating over the backhaul and access links during separate time periods.

Example 41 includes the subject matter of Example 39 and optionally comprising means for communicating over the backhaul and access links during a common time period.

Example 42 includes the subject matter of Example 41 and optionally comprising means for communicating over the backhaul and access links according to a Multi-User (MU) Multi-Input-Multi-Output (MIMO) scheme.

Example 43 includes the subject matter of Example 41 or 42 and optionally comprising means for transmitting communications over the backhaul and access links during a first common time period, and means for receiving communications over the backhaul and access links during a second common time period.

Example 44 includes the subject matter of any one of Examples 39-43 and optionally, wherein the backhaul links comprise links for communicating traffic between the mobile devices and a core network.

Example 45 includes the subject matter of any one of Examples 39-44 and optionally comprising means for controlling one or more first sub-arrays of the antenna array to form the one or more first beams, and controlling one or more second sub-arrays of the antenna array to form the one or more second beams.

Example 46 includes the subject matter of any one of Examples 39-45 and optionally, wherein the access links and backhaul links comprise beamformed links.

Example 47 includes the subject matter of any one of Examples 39-46 and optionally, wherein the access links and backhaul links comprise links over a millimeter-wave (mm-Wave) band or a directional multi-gigabit (DMG) band.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
    an antenna array including a plurality of antenna elements;
    a Multi-Input-Multi-Output (MIMO) and beamforming processor to control the plurality of antenna elements to form a plurality of directional beams and to process communications via beamformed links over the plurality of directional beams according to a Multi User (MU) MIMO processing scheme, said beamformed links including links over a millimeter-wave (mmWave) band or a directional multi-gigabit (DMG) band, the beamformed links including one or more access links and one or more backhaul links, said one or more access links to communicate between a wireless communication node and one or more mobile devices, and said one or more backhaul links to communicate between said wireless communication node and one or more other wireless communication nodes, the MIMO and beamforming processor to control one or more first sub-arrays of said antenna array to form one or more first beams to communicate communications of said one or more backhaul links, and to control one or more second sub-arrays of said antenna array to form one or more second beams to communicate communications of said one or more access links;
    a backhaul processor to process the communications of said one or more backhaul links;
    a first plurality of baseband processors to perform baseband processing between said backhaul processor and said MIMO and beamforming processor;
    an access processor to process the communications of said one or more access links; and
    a second plurality of baseband processors to perform baseband processing between said access processor and said MIMO and beamforming processor.

2. The apparatus of claim 1, wherein said MIMO and beamforming processor is to control said antenna array to communicate over said backhaul and access links during separate time periods.

3. The apparatus of claim 1, wherein said MIMO and beamforming processor is to control said antenna array to communicate over said backhaul and access links during a common time period.

4. The apparatus of claim 1, wherein one or more baseband processors of said first plurality of baseband processors are to decode the communications of said one or more backhaul links from said MIMO and beamforming processor, and to encode the communications of said one or more backhaul links from said backhaul processor.

5. The apparatus of claim 3, wherein said MIMO and beamforming processor is to control said antenna array to transmit communications over said backhaul and access links during a first common time period, and to receive communications over said backhaul and access links during a second common time period.

6. The apparatus of claim 1, wherein said backhaul links comprise links for communicating traffic between said mobile devices and a core network.

7. The apparatus of claim 1, wherein one or more baseband processors of said second plurality of baseband processors are to decode the communications of said one or more access links from said MIMO and beamforming processor, and to encode the communications of said one or more access links from said access processor.

8. A wireless communication system comprising:
    at least one wireless communication node to communicate with one or more mobile devices of a wireless communication cell, said wireless communication node comprising:
        an antenna array including a plurality of antenna elements;
        a Multi-Input-Multi-Output (MIMO) and beamforming processor to control said plurality of antenna elements to form a plurality of directional beams and to process communications via beamformed links over the plurality of directional beams according to a Multi User (MU) MIMO processing scheme, said beamformed links including links over a millimeter-wave (mmWave) band or a directional multi-gigabit (DMG) band, the beamformed links including one or more access links and one or more backhaul links, said one or more access links to communicate between said wireless communication node and said mobile devices of said wireless communication cell, and said one or more backhaul links to communicate between said wireless communication node and one or more other wireless communication nodes of one or more other wireless communication cells, the MIMO and beamforming processor to control one or more first sub-arrays of said antenna array to form one or more first beams to communicate communications of said one or more backhaul links, and to control one or more second sub-arrays of said antenna array to form one or more second beams to communicate communications of said one or more access links;
        a backhaul processor to process the communications of said one or more backhaul links;
        a first plurality of baseband processors to perform baseband processing between said backhaul processor and said MIMO and beamforming processor;
        an access processor to process the communications of said one or more access links; and
        a second plurality of baseband processors to perform baseband processing between said access processor and said MIMO and beamforming processor.

9. The system of claim 8, wherein said MIMO and beamforming processor is to control said antenna array to communicate over said backhaul and access links during separate time periods.

10. The system of claim 8, wherein said MIMO and beamforming processor is to control said antenna array to communicate over said backhaul and access links during a common time period.

11. The system of claim 8, wherein one or more baseband processors of said first plurality of baseband processors are to decode the communications of said one or more backhaul links from said MIMO and beamforming processor, and to encode the communications of said one or more backhaul links from said backhaul processor.

12. The system of claim 10, wherein said MIMO and beamforming processor is to control said antenna array to transmit communications over said backhaul and access links during a first common time period, and to receive communications over said backhaul and access links during a second common time period.

13. The system of claim 8, wherein said backhaul links comprise links for communicating traffic between said mobile devices and a core network.

14. The system of claim 8, wherein one or more baseband processors of said second plurality of baseband processors are to decode the communications of said one or more access links from said MIMO and beamforming processor, and to encode the communications of said one or more access links from said access processor.

15. The system of claim 8 comprising a plurality of wireless communication nodes forming a plurality of wireless communication cells, said plurality of wireless communication nodes to communicate over a backhaul network formed by a plurality of wireless backhaul links between said plurality of wireless communication nodes.

16. The system of claim 8, wherein said wireless communication node comprises a Base Station (BS).

17. A product including a non-transitory storage medium having stored thereon instructions that, when executed by a machine, result in:
controlling a plurality of antenna elements of an antenna array of a wireless communication node to form a plurality of directional beams;
processing communications via beamformed links over the plurality of directional beams according to a Multi User (MU) Multi-Input-Multi-Output (MIMO) processing scheme, said beamformed links including links over a millimeter-wave (mmWave) band or a directional multi-gigabit (DMG) band, the beamformed links including one or more wireless access links and one or more backhaul links, said one or more wireless access links to communicate between said wireless communication node and one or more mobile devices, and said one or more backhaul links to communicate between said wireless communication node and one or more other wireless communication nodes; and
controlling one or more first sub-arrays of said antenna array to form one or more first beams to communicate communications of said one or more backhaul links, and controlling one or more second sub-arrays of said antenna array to form one or more second beams to communicate communications of said one or more access links.

18. The product of claim 17, wherein said instructions result in communicating over said backhaul and access links during separate time periods.

19. The product of claim 17, wherein said instructions result in communicating over said backhaul and access links during a common time period.

20. The product of claim 17, wherein said backhaul links comprise links for communicating traffic between said mobile devices and a core network.

21. The product of claim 19, wherein said instructions result in transmitting communications over said backhaul and access links during a first common time period, and receiving communications over said backhaul and access links during a second common time period.

22. A method of wireless communication, the method comprising:
controlling a plurality of antenna elements of an antenna array of a wireless communication node to form a plurality of directional beams;
processing communications via beamformed links over the plurality of directional beams according to a Multi User (MU) Multi-Input-Multi-Output (MIMO) processing scheme, said beamformed links including links over a millimeter-wave (mmWave) band or a directional multi-gigabit (DMG) band, the beamformed links including one or more wireless access links and one or more backhaul links, said one or more wireless access links to communicate between said wireless communication node and one or more mobile devices, and said one or more backhaul links to communicate between said wireless communication node and one or more other wireless communication nodes; and
controlling one or more first sub-arrays of said antenna array to form one or more first beams to communicate communications of said one or more backhaul links, and controlling one or more second sub-arrays of said antenna array to form one or more second beams to communicate communications of said one or more access links.

23. The method of claim 22 comprising communicating over said backhaul and access links during separate time periods.

24. The method of claim 22 comprising communicating over said backhaul and access links during a common time period.

* * * * *